United States Patent [19]

Bonga

[11] Patent Number: 4,460,816
[45] Date of Patent: Jul. 17, 1984

[54] APPARATUS FOR ORIENTING THE WIRE ELECTRODE SUPPORT AND GUIDE MEMBER AND THE MACHINING FLUID NOZZLE OF A TRAVELLING WIRE EDM APPARATUS

[75] Inventor: Benno Bonga, Crans, Switzerland

[73] Assignee: Ateliers des Charmilles, S.A., Geneva, Switzerland

[21] Appl. No.: 395,298

[22] Filed: Jul. 6, 1982

[51] Int. Cl.³ .............................................. B23P 1/08
[52] U.S. Cl. ................................. 219/69 W; 219/69 G
[58] Field of Search ............... 219/69 W, 69 M, 69 R, 219/68, 69 V, 69 E, 69 G

[56] References Cited

FOREIGN PATENT DOCUMENTS 24805 2/1980 Japan ................................ 219/69 W

*Primary Examiner*—M. H. Paschall
*Attorney, Agent, or Firm*—Hauke and Patalidis

[57] ABSTRACT

In a travelling wire EDM apparatus, a unitary assembly of at least one of the electrode wire support members and a machining fluid nozzle disposed coaxially to the wire is installed on a plate which is displaceable such as to provide the electrode wire passing through the machining zone in the workpiece with an appropriate inclination. Inclination of the unitary assembly of the electrode wire support member and machining fluid nozzle is obtained by a swivel member mounted on the plate and oriented by a tube through which the electrode wire is passed. The tube is supported along its length by a pivot which is at all times disposed symmetrically to the electrode wire lower support member relative to a plane of symmetry. The unitary assembly is also supported by a swivel joint member interconnected to the first swivel joint member such that the angular displacement of the respective swivel joint members are symmetrical.

2 Claims, 4 Drawing Figures

APPARATUS FOR ORIENTING THE WIRE ELECTRODE SUPPORT AND GUIDE MEMBER AND THE MACHINING FLUID NOZZLE OF A TRAVELLING WIRE EDM APPARATUS

BACKGROUND OF THE INVENTION

The present invention relates to travelling wire EDM apparatus in general, and more particularly to a device for orienting the electrode wire support and guide member and the machining fluid injection nozzle of a travelling wire EDM apparatus.

It is known to provide travelling wire EDM apparatus with a device permitting to controllably orient an electrode wire support and guide member and to aim in an appropriate direction a nozzle injecting machining fluid in the machining zone between the electrode wire and the workpiece, the EDM apparatus comprising a support for the electrode wire support and guide members, a support for the workpiece, means for relatively displacing the support of the electrode wire support and guide members and the workpiece support such as to cut the workpiece according to a desired path, means for displacing a holder for the wire support and guide member in directions transverse to the longitudinal axis of the electrode wire, and means for orienting at least one of the wire support and guide members along the axis of the portion of the wire electrode in the machining zone.

Such a device is disclosed for example in French Pat. No. 2,454,869.

The orientation of the guide member depends of course from the offset between the two wire support and guide members, one being disposed above the machining zone and the other below the machining zone and of the further distance separating the two guide members. In some EDM apparatus, the vertical distance is adjusted as a function of the thickness of the workpiece, in view of the fact that it is advantageous, in order to provide precise machining, to dispose the electrode wire guide members as close as possible to the machining zone. The problem presented by the requirement of adjusting the oreintation angle of a wire guide member as a function of the distance between the two guide members, by means of a purely mechanical structure, has, until now, remained unresolved.

SUMMARY OF THE INVENTION

The principal object of the present invention is to provide a mechanical solution to the above-mentioned problem. The invention provides a mechanism comprising a plate supporting a pair of swivel universal joints each disposed on one side of a plane of symmetry such as to pivot in sockets disposed in opposite surfaces of the plate, one of the joints being the support of a unitary assembly comprising one of the wire guide members and a machining fluid nozzle, and the other joint being attached to a rod having a stationary pivot center disposed symmetrically relative to the other wire guide member relative to a plane of symmetry, and comprising means mechanically interconnecting the swivel joints, such means being arranged such as to cause symmetrical angular displacements of the joints relative to the plane of symmetry.

Futher objects and advantages of the present invention will become apparent to those skilled in the art when the following description of examples of the best mode contemplated for practicing the invention is read in conjunction with the accompanying drawing wherein:

DETAILED DESCRIPTION OF THE PREFERRED EMBODIMENTS

Figure 1:
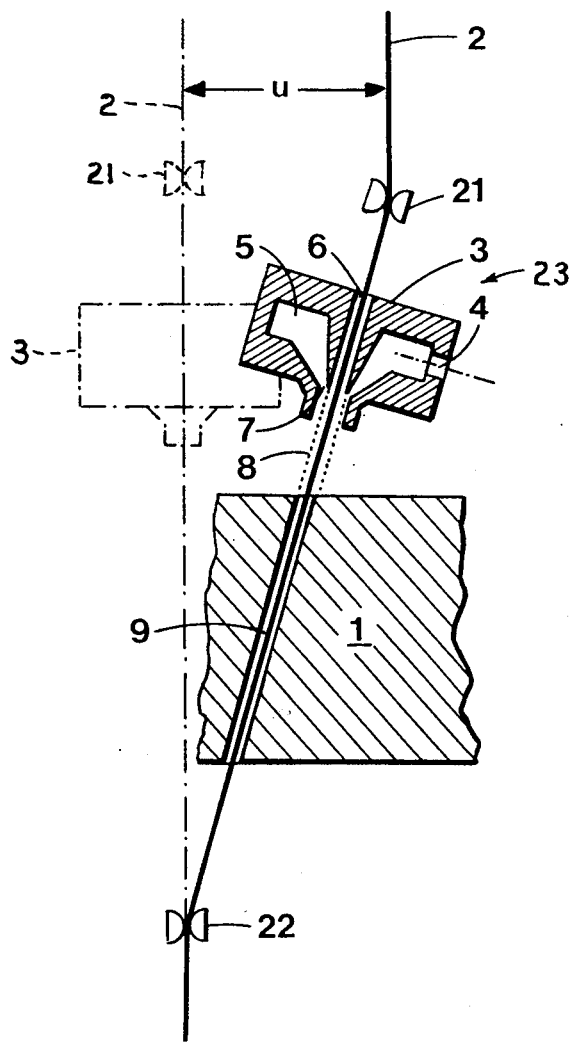
FIG. 1 is a schematic view useful in understanding the principle of the present invention.

FIG. 1 of the drawing illustrates an electrode workpiece 1 in the process of being cut by means of an electrode wire 2 supported and guided by a pair of guide members 21 and 22, one disposed on one side and the other on the other side of the workpiece 1. The electrode wire 2 passes through a nozzle 3 such that the nozzle surrounds the wire. The nozzle 3 has a dielectric fluid inlet 4 leading into an annular chamber 5 surrounding a channel 6 through which passes the electrode wire 2. The dielectric fluid introduced into the annular chamber 5 flows through an annular outlet 7 such as to form a jet 8 surrounding the electrode wire and directed towards the machining zone 9 between the electrode wire 2 and the workpiece 1. The nozzle 3 and the wire guide member 21 form a unitary assembly, or head, generally designated at 23, for guiding the wire and injecting dielectric fluid in the machining zone 9. When the wire upper guide member 21 is in the position illustrated in phantom lines, the nozzle 3 and the electrode wire 2 are also in the position represented in phantom lines. When the guide member 21 is displaced of a distance u from the position shown in phantom lines to the position shown in full lines, the nozzle 3 must be oriented in a direction corresponding to the inclination of the wire 2, such that the dielectric fluid jet 8 remains coaxial to the wire.

Figure 2:
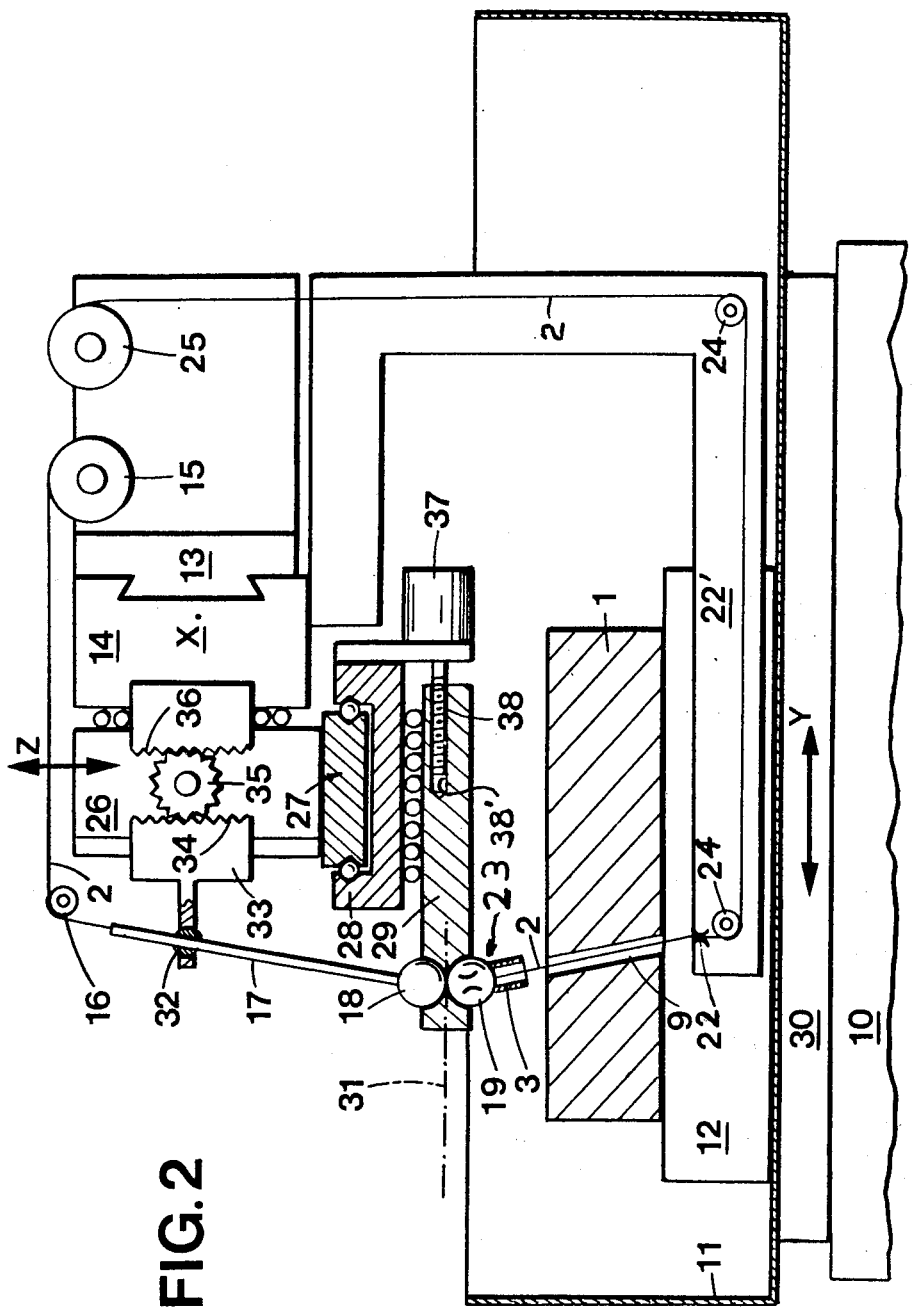
FIG. 2 is a side elevation view of a travelling wire EDM apparatus with some portion shown in section.

As illustrated at FIG. 2, the travelling wire EDM apparatus comprises a base 10 supporting a tank 11 in which the workpiece 1 is mounted by means of supports 12. The base 10 carries an overhead bridge member 13 supporting a slide 14 supporting in turn the guide members of the electrode wire 2.

The electrode wire 2 is obtained from a supply spool 15 and, after passing over a roller 16, is introduced into a guide tube 17 terminating, at its lower end, in a swivel joint 18. The swivel joint 18 is interconnected with a second swivel joint 19 supporting the dielectric fluid nozzle 3. The electrode wire 2, after passage through the nozzle 3, passes through the machining zone 9 in the workpiece 1 and through a wire support and guide member 22 supported by a support arm 22' attached to the slide 14. After passing through the wire support and guide member 22, the electrode wire 2 is wound around a pair of rollers 24 and winds itself over a receiving spool 25.

The slide 14 carries a support member 26 which can be vertically displaced along a Z-axis. The lower portion of the support member 26 is provided with a cross-slide table 27 comprising a pair of slides 28 and 29, the slide 29 being in the form of a plate. The cross-slide table allows displacement of the plate 29 and, consequently, of the swivel joints 18 and 19 and of the nozzle 3 relative to the lower wire support and guide member 22 for providing the electrode wire 2 with an appropriate inclination or orientation through the machining zone 9, the machining zone 9 being at an angle relative to the plane of the workpiece 1. The cutting path through the workpiece 1 is determined by the displacements of the slide 14 along the X-axis, perpendicular to the plane of the drawing, in combination with the displacements along the Y-axis of a table 30 supporting the tank 11 and the workpiece 1. Such an arrangement is well known in travelling wire EDM technology and does not require further description or illustration.

The means enabling the nozzle 3 to be maintained oriented along the longitudinal axis of the electrode wire 2 through the machining zone 9 comprises a mechanical connection between the swivel joints 18 and 19 which is arranged such as to obtain symmetrical angular displacement of the swivel joints relative to an imaginary plane of symmetry 31 which is parallel to the plane of the plate 29. The angular motions of the swivel joint 19 are controlled by the angular motions of the swivel joint 18 which are in turn controlled by the orientation of the tube 17. For that purpose, the tube 17 is supported by a swivelling pivot 32 which is disposed symmetrically to the electrode wire support and guide member 22 relative to the plane of symmetry 31.

As the support member 26 is capable of vertical displacement to adjust the distance between the unitary assembly 23 of the upper wire support and guide member 21 and the nozzle 3 and the lower wire support and guide member 22 as a function of the thickness of the workpiece 1, the swivelling pivot 32 must be displaced such that the distance between it and the plane of symmetry 31 remains constantly substantially equal to the distance between the plane of symmetry 31 and the lower wire support and guide member 22. This is achieved by means of a slide 33 having a rack 34 meshing with a freely rotatable toothed wheel 35. The toothed wheel 35 peripherally engages a rack 36 attached to the slide 14. In this manner, any vertical displacement of the support member 26, and consequently of the plane of symmetry 31, causes twice the same amount of displacement of the swivelling pivot 32 relative to the lower wire support and guide member 22. The plane of symmetry 31 is therefore always located at middistance between the swivelling pivot 32 and the lower electrode wire support and guide member 22.

The displacement of the slide 28 and plate 29 of the cross-slide table 27 are controlled by electric servo motors, for example stepping motors. The displacement of the plate 29 relative to the slide 28 is obtained by way of a servo motor 37 having an output shaft provided with a leadscrew 38 engaged in a corresponding threaded bore 38' in the plate 29. The displacement of the slide 28 relative to the support member 26 is obtained by way of another servo motor, not shown, driving a leadscrew meshing in a correspondingly threaded bore in the slide 28.

Figure 3:
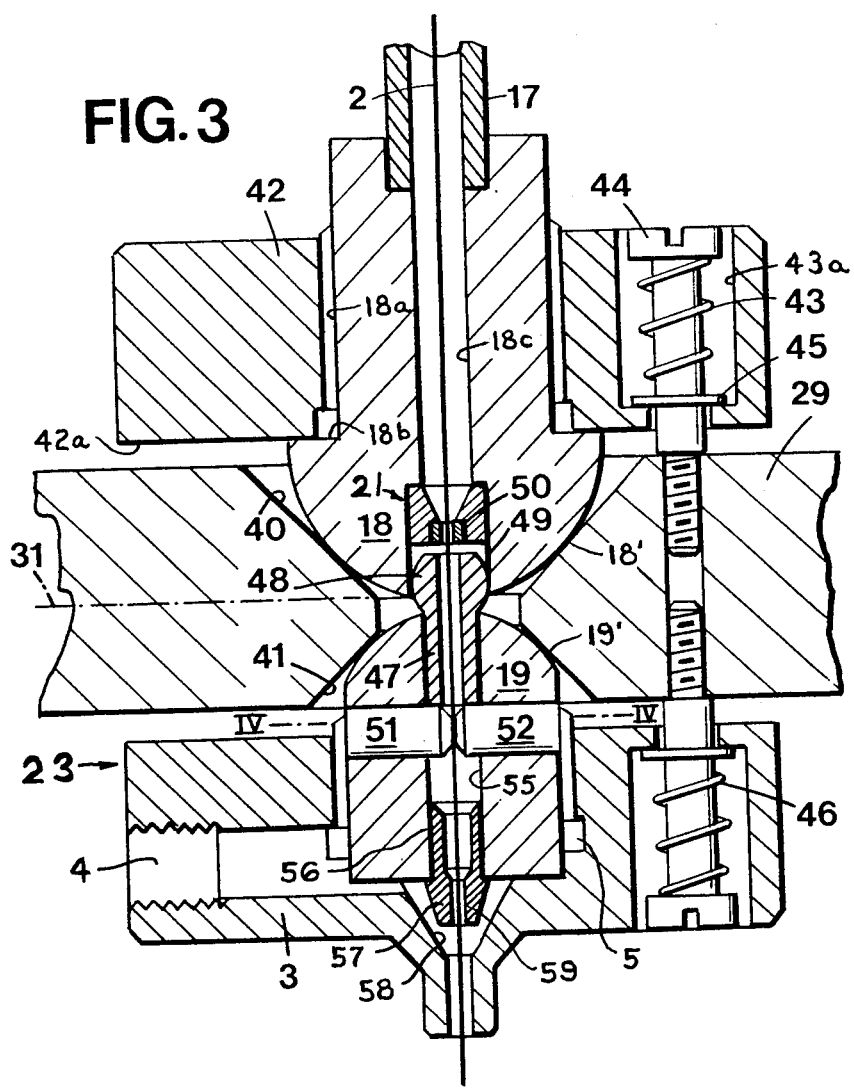
FIG. 3 is a section, at an enlarged scale, of a portion of the apparatus of FIG. 2.

As shown in FIG. 3, which is an enlarged scale representation in section of the mechanical connection between the swivel joints 18 and 19, each of the joints comprises a generally hemispherical enlarged portion 18' and 19', disposed in a frusto-conical socket 40 and 41, respectively, in the plate 29. The swivel joint 18 has a reduced diameter body portion 18a forming an annular step 18b engaged by an end face 42a of an annular retainer 42 urged toward the plate 29 by, for example, three coil springs 43 disposed each around a screw 44 in a vertical bore 43a in the retainer 42 and compressed between the head of the screw 44 and a washer 45 engaged with the bottom of the bore 43a, the screws 44 threading into the plate 29. The screws 44, two of which are not visible at FIG. 3, are disposed 120° from each other around the swivel joint body member 18a each through a corresponding bore 43a through the retainer 42, the bores 43a being also disposed 120° from each other.

The lower swivel joint member 19 is preferably made integral with the nozzle 3 and is urged in the direction of the plate 29 by means, for example, of three coil springs 46, one of which only is shown at FIG. 3, mounted around appropriate bolts passed through appropriate bores in the solid portion of the nozzle 3, in the same manner as the retainer 42 urges the swivel joint member 18 in engagement with the conical socket 40 and towards the plate 29. The swivel joint member 19 is provided with a tubular member 47 projecting therefrom and provided with a spherical end portion 48 disposed in a circularly cylindrical bore 49 formed in the end of the swivel joint member 18. The swivel joint member 18 has a central bore 18c in communication with, and aligned with, the interior of the tube 17 through which the electrode wire 2 passes. A cylindrical bearing 50 made, for example, of synthetic ruby is disposed in the bore 49 at the end of the swivel joint member 18, and provides a bearing surface for the electrode wire 2 while passing from the swivel joint member 18 to the swivel joint member 19.

Figure 4:
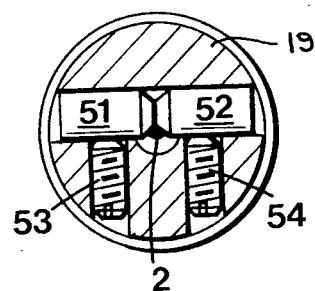
FIG. 4 is a section along line IV—IV of FIG. 3.

The swivel joint member 19 supports a pair of cylindrical plugs 51 and 52, each having a chamfered end, which form a V-guide for the electrode wire 2. The plugs 51 and 52 are held in position by set screws 53 and 54, FIG. 4. The swivel joint member 19 has a central bore 55 providing passage of the electrode wire 2 therethrough, a tubular member 56 fitted on the end of the bore 55 having a tapered portion 57 projecting into a tapered bore 58 formed in the nozzle 3 aiding in forming the jet of fluid and presenting a restricted passage 59 preventing backflow of fluid into the bore 55.

Because the coupling between the swivel joint member 18 and the swivel joint member 19 is effected via the spherical end portion 58 of the tubular member 47 disposed in the bore 49 at the end of the swivel joint member 18, the two swivel joint members 18 and 19 are connected such that their swivelling motions are always symmetrical relative to the plane of symmetry 31.

It will be appreciated by those skilled in the art that the lower electrode wire support and guide member 22, FIG. 2, can be replaced by a wire guide and fluid nozzle unitary assembly similar to that described hereinbefore. In such an arrangement, the displacement of the lower wire guide and fluid nozzle unit can be controlled by a mechanical or electrical device such that the displacements of the lower unit correspond to the displacements of the upper unit, with the result that the lower nozzle remains constantly axially aligned with the portion of the electrode wire 2 disposed in the machining zone 9.

I claim:

1. In a travelling wire EDM apparatus wherein a workpiece is cut by electrical discharges between a wire electrode and said workpiece, said apparatus comprising a pair of guide members for said electrode wire, support means for said workpiece, and means displacing said electrode wire guide members and said workpiece support means one relative to the other such as to cut said workpiece according to a desired shape, a mechanism for orienting a unitary assembly of one of said electrode wire guide members and means for injecting machining fluid in a machining zone between said electrode wire and said workpiece, said mechanism comprising a plate, a pair of swivel joint members supported by said plate one on one side and the other on the other side of a plane of symmetry of said swivel joint members, one of said swivel joint members supporting said unitary assembly and the other being attached to a rod having a stationary pivot, said stationary pivot being disposed symmetrically relative to said plane of symmetry to the other of said electrode wire support means, and means interconnecting said swivel joint members such as to cause angular displacement of said swivel joint members symmetrically relative to said plane of symmetry.

2. The mechanism of claim 1 further comprising means for displacing said plate along the longitudinal axis of said electrode wire, and means for displacing said pivot in the same direction as the direction of the displacement of said plate of a distance twice the distance of displacement of said plate.

* * * * *